Aug. 5, 1941.　　　A. W. ANDERSON　　　2,251,349
FRICTION CLUTCH
Filed Sept. 29, 1938
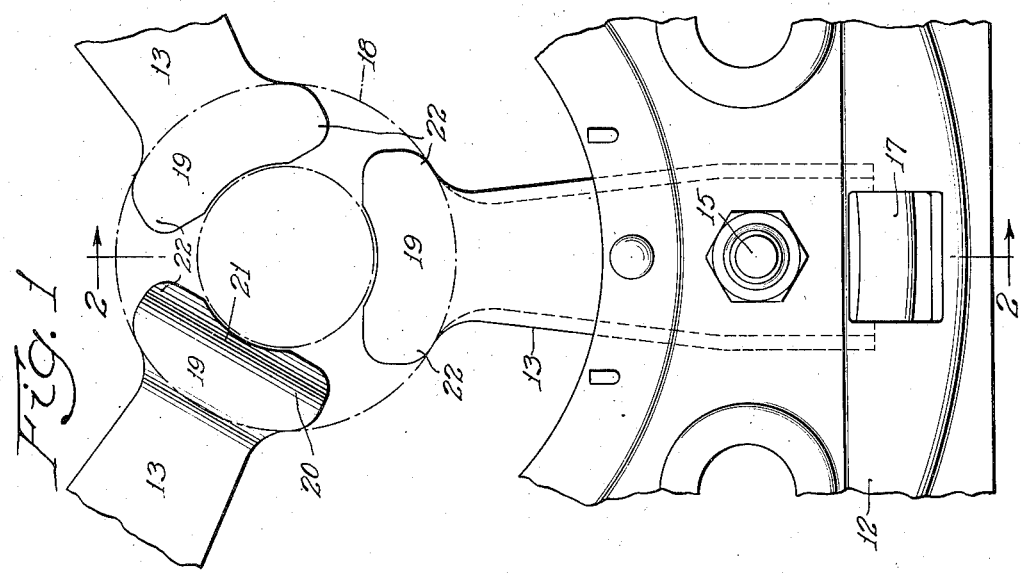
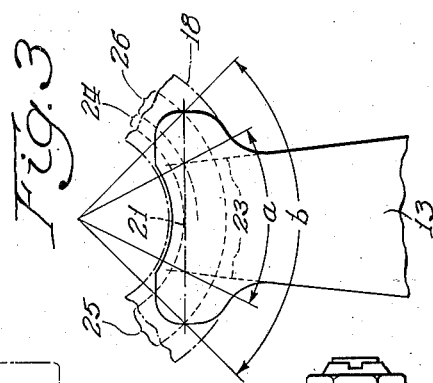
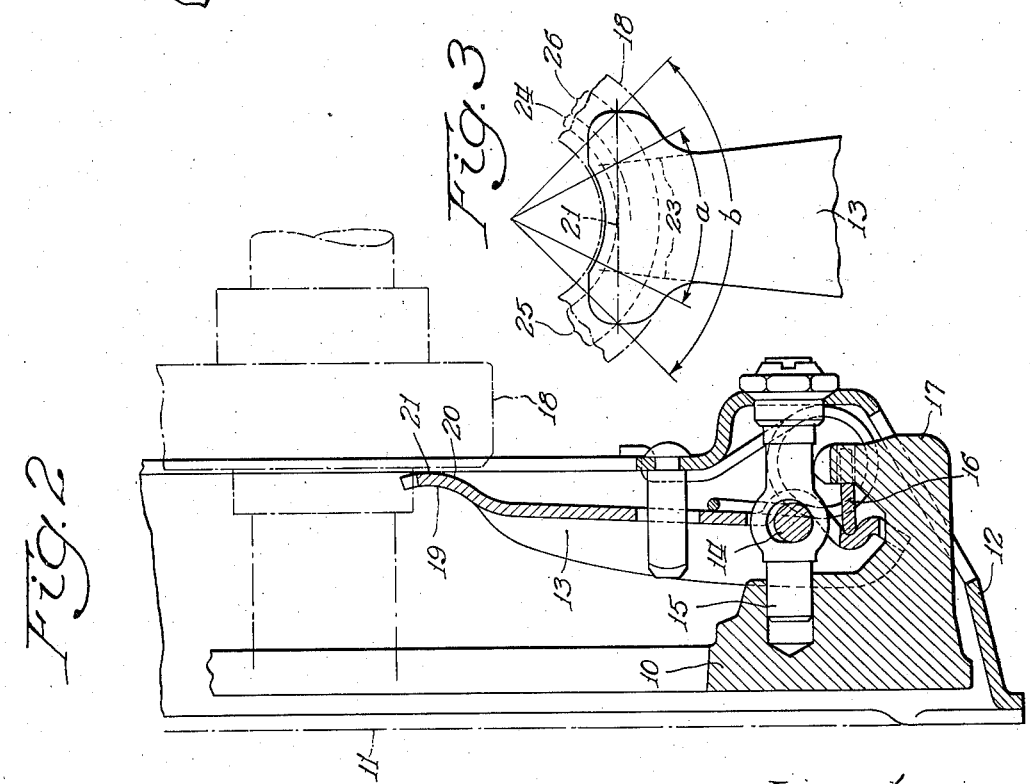
Inventor:
Arthur W. Anderson
By Edward C. Gritzbaugh
Atty.

Patented Aug. 5, 1941

2,251,349

UNITED STATES PATENT OFFICE 2,251,349

FRICTION CLUTCH

Arthur W. Anderson, Chicago, Ill., assignor to Borg-Warner Corporation, Chicago, Ill., a corporation of Illinois Application September 29, 1938, Serial No. 232,247
In Great Britain August 24, 1938

1 Claim. (Cl. 192—99)

This invention, relating, as indicated, to friction clutches, deals particularly with the collar-engaging end of a clutch release lever in a clutch of the type wherein the release levers have direct rotary sliding engagement with an operating collar.

The primary object of the invention is to provide a clutch of this type which is of simplified construction and yet has a minimum of wear between the engaging portions of the release levers and the operating collar.

A common practice in clutch manufacture, aimed at reduction of wear, has been to interpose a bearing between the rotating release levers and the non-rotatable operating collar. In some cases this bearing has been simply a flat washer of bearing material. Again, resort has been had to a ball-bearing or roller-bearing of the end thrust type. The present invention contemplates the elimination of all such bearings and the operation of the release levers in direct sliding contact with the operating collar which may be formed of a material having a low coefficient of friction. One of the objects in doing so is to provide for ventilation of the bearing surface and the escape therefrom of the fine particles of material worn from the ends of the release levers by their sliding engagement with the bearing surface on the collar. Where an annular bearing washer is interposed between the levers and the bearing plates of the operating collar, there is no ventilation of the bearing surfaces, and there is no provision for escape of the metal particles which remain confined between the bearing surfaces and greatly increase the wear.

It has been common in the past to build clutches with the release levers in direct slidable engagement with the non-rotatable operating collar. However, such clutches were not satisfactory from the standpoint of long service, and after a limited period of operation, would develop sufficient wear to appreciably affect the smoothness of operation of the clutch operating mechanism and develop play between the operating parts, and the end thrust bearings referred to above have been commonly resorted to for the purpose of correcting this difficulty.

The present invention provides a clutch which may operate for many years of normal service in a motor vehicle without developing appreciable play in the relative adjustment of the operating parts, or noticeably affecting smoothness of operation thereof.

The above and other objects, advantages and uses of my invention will become apparent from a reading of the following specification and claims taken in connection with the appended drawing which forms a part of the specification and wherein:

Fig. 1 is a rear elevation of a portion of a friction clutch embodying the invention;

Fig. 2 is an axial sectional view thereof taken on the line 2—2 of Fig. 1; and

Fig. 3 is a diagram illustrating how the clutch release lever contacts the operating collar.

As an illustration of one form in which the invention may be embodied, I have shown in the drawing the pressure plate assembly of a friction clutch of a well-known make of vehicle. The pressure plate 10, which serves to clamp the driven member of the clutch (not shown) against the face 11 of the fly-wheel, is mounted in a clutch cover plate 12, which is adapted to be secured to the fly-wheel face 11. The packing pressure is developed by conventional spring means (not shown) normally urging the pressure plate 10 toward the fly-wheel face 11, and the clutch is released through the medium of the release levers 13, which are fulcrumed at 14 upon studs 15, suspended between the cover 12 and the pressure plate 10. The outer ends of the levers 13 transmit pressure to the plate 10 through the medium of thrust-transmitting struts 16 engaged between the levers and the overhanging lugs 17 formed on the pressure plate 10. Releasing pressure is transmitted to the levers 13 by the operating collar 18, which engages against the inner ends of the levers 13. The collar 18 is preferably made of some material having a relatively low coefficient of friction, such as a graphite impregnated bronze, or Bakelite, or any other suitable material of similar characteristics.

The levers 13 are of formed sheet metal, in accordance with preferred practice at the present time. Their engaging ends 19 have cylindrical engaging surfaces 20, also in accordance with the preferred practice. Such an engaging surface produces a straight line of contact, as indicated by the broken line 21 in Fig. 2, and although this line of contact may shift a trifle toward or from the center of the clutch, as the levers are rocked back and forth, it remains a full-length line of contact irrespective of the position of the levers. The advantages of this form of engagement surface have proven to be very substantial, to the extent that it is widely employed in the clutch art.

The present invention greatly reduces the wear on the engaging surfaces in this type of construction by providing lateral extensions 22 of the engaging portion 19. These extensions extend the line of contact 21 to somewhat less than twice the length that the line of contact would have in the old style lever wherein the sides were straight to the end of the lever as indicated by the broken line 23 in Fig. 3. However, although the total length of the line of contact is increased less than 100 per cent., the total area of contact against the face of the collar 18 is increased considerably more than 200 per cent. This will be apparent from an inspection of Fig. 3, wherein the path 24 of contact on the face of the collar 18, generated by the line of contact 21 encompassed between the lines 23 represents the area of contact in the old style lever, while the path 25 of contact against the face of the collar 18 generated by the full length flange 21 represents the area of contact in the present invention. The additional area of contact which is provided by the present invention is indicated at 26, and, since the radial width thereof is approximately twice that of the area 24, whereas the mean radius is greater, the additional area will obviously be considerably more than a 200 per cent. increase.

The circumferential extent of the engaging portions of the levers can best be defined in terms of the angle at the axis of the clutch, subtended by the line of contact 21. This angle, indicated at $a$ in Fig. 3 for the old style lever, is definitely less than 60 degrees, being in the neighborhood of approximately 55 degrees, whereas the angle $b$ subtended by the line of contact of the improved lever of the present invention, is definitely greater than 60 degrees, being in the neighborhood, preferably, of 90 degrees.

Further inspection and consideration of Fig. 3 will more clearly reveal the advantages of the invention. The end edges of the three cylindrical engaging surfaces of the old style lever, were very nearly radial, i. e. at right angles to the path of movement of the levers with respect to the bearing face of the collar 18. As a result of this, and of the relatively narrow area of contact 24 against the bearing face of the collar, a definite gouging acting of the engaging portion of the lever against the collar, was evident. In the present invention, on the other hand, the angle of the end edges of the cylindrical engaging portions of the levers, are disposed at approximately an angle of 45 degrees to the path of movement of the lever relative to the collar surface. The outer extremity of the line of contact 21 also is disposed at approximately a 45° angle to its direction of movement relative to the collar 18, so that the curved bearing face 20 of the engaging portion 19 may perform a sled runner function, causing the leading portion of the lever to slide smoothly over the surface of the collar with practically a complete absence of the gouging action characteristic of the old style lever. To say it in different terms, the direction of relative movement of the collar surface with respect to the line of contact 21 and the leading side of the lever, is relatively transverse, whereas in the old style lever, it was predominantly parallel to the line of contact.

I do not intend to claim as the present invention, simply the widening of the inner ends of any type of clutch lever. There have been a few cases of incidental widening of the inner ends of the various type of narrow, solid metal clutch release levers. In this early stage of development of the clutch art, it was almost universally the practice to employ extremely narrow levers, and the widening in such cases would not bring the total circumferential extent of the lever bearing portion within the limits indicated herein.

In the more recent development of the stamped sheet metal release lever, the width of the lever as a whole has been increased with respect to these early solid metal forms, but purely from the standpoint of providing the levers with sufficient strength and rigidity. I know of no case wherein the engaging end portion of this type of lever has been extended laterally, or wherein a clutch release lever of any type has been provided at its engaging end with lateral extensions for the purpose of greatly decreasing wear in the type of clutch wherein the levers have direct sliding engagement against the operating collar.

It will be seen that the present invention eliminates the necessity of employing a thrust bearing between the reverse and the operating collar, thereby substantially simplifying the construction and decreasing the expense thereof. Also, the spaces between the release levers provide for ventilation of the bearing surface of the operating collar 18 and provide channels through which the small particles that are worn away from the engaging surfaces, may be thrown outwardly by centrifugal force away from the bearing surfaces.

I claim:

A clutch including an operating collar having a flat bearing face perpendicular to the axis of the clutch, a cylindrical member of a driven shaft assembly associated with said collar, and a plurality of radially arranged release levers each having its inner end region circumferentially extended to provide a pair of projections, the end edge of the lever intermediate said projections being concavely arcuate to conform to the contour of said cylindrical member, said projections and the region of the lever between said projections being formed to provide a cylindrical surface having a substantially tangential line of contact with said bearing face subtending an angle at the axis of rotation of approximately 90°, said line of contact approaching closely to said arcuate edge, and the cylindrical surface of said projections curving away from the bearing face of said collar a greater extent than the surface of said intermediate region.

ARTHUR W. ANDERSON.